United States Patent
Wright et al.

(10) Patent No.: US 10,619,724 B2
(45) Date of Patent: Apr. 14, 2020

(54) METHOD OF ADJUSTING DECELERATION DEPENDENT SHIFT POINTS

(71) Applicant: GM GLOBAL TECHNOLOGY OPERATIONS LLC, Detroit, MI (US)

(72) Inventors: Henry R Wright, Huntington Wood, MI (US); Brandon M Fell, Milford, MI (US); Martin Gentile, Ruesselsheim (DE); Rainer Kloesel, Ruesselsheim (DE); Falko Hendrischke, Ruesselsheim (DE); Julian Heinz, Ruesselsheim (DE); Marcel Wachtel, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 235 days.

(21) Appl. No.: 15/667,169

(22) Filed: Aug. 2, 2017

(65) Prior Publication Data
US 2019/0040946 A1      Feb. 7, 2019

(51) Int. Cl.
| | |
|---|---|
| *F16H 59/44* | (2006.01) |
| *F16H 61/02* | (2006.01) |
| *F16H 59/48* | (2006.01) |
| *F16H 61/10* | (2006.01) |
| *F16H 59/38* | (2006.01) |
| *F16H 59/42* | (2006.01) |

(52) U.S. Cl.
CPC ......... *F16H 59/44* (2013.01); *F16H 61/0213* (2013.01); *F16H 59/48* (2013.01); *F16H 61/10* (2013.01); *F16H 2059/385* (2013.01); *F16H 2059/425* (2013.01); *F16H 2300/02* (2013.01)

(58) Field of Classification Search
CPC .............. F16H 2059/385; F16H 61/10; F16H 61/0213; F16H 61/68; F16H 61/686; F16H 59/42; F16H 59/425; F16H 59/44; F16H 59/48; F16H 2300/02; F01N 3/0232; F01N 9/002
See application file for complete search history.

(56) References Cited

U.S. PATENT DOCUMENTS

| | | | | |
|---|---|---|---|---|
| 4,852,006 A | * | 7/1989 | Speranza | B60W 10/06 701/55 |
| 6,405,587 B1 | * | 6/2002 | Livshiz | F02D 31/002 73/114.25 |

(Continued)

FOREIGN PATENT DOCUMENTS

CN        105829182 A        8/2016

*Primary Examiner* — Jacob S. Scott
*Assistant Examiner* — Lori Wu

(57) ABSTRACT

A method of adjusting deceleration dependent shift points to maintain a target minimum turbine speed includes calculating a vehicle speed offset based on vehicle acceleration rate a predicted downshift delay for the target minimum turbine speed and converting the target minimum turbine speed to a target vehicle speed based on the deceleration condition. Thereafter, the method continues with determining a target gear based on the vehicle speed offset and the target vehicle speed, and downshifting to the target gear having vehicle speed less than or equal to a vehicle speed corresponding to the current turbine speed. The method ends with maintaining the target gear until a shift delay period is greater than a predetermined delay threshold.

16 Claims, 4 Drawing Sheets

(56) References Cited

U.S. PATENT DOCUMENTS

| | | | | |
|---|---|---|---|---|
| 2004/0020194 A1* | 2/2004 | Nishimura | .............. | F01N 3/023 |
| | | | | 60/297 |
| 2008/0090697 A1* | 4/2008 | Ortmann | ................ | B60K 6/365 |
| | | | | 477/15 |
| 2012/0173098 A1* | 7/2012 | Swartling | ............. | B60W 30/19 |
| | | | | 701/51 |
| 2014/0329643 A1* | 11/2014 | Matsuo | ................... | F16H 61/16 |
| | | | | 477/115 |
| 2017/0028990 A1* | 2/2017 | Yokokawa | ............ | B60W 10/06 |
| 2019/0024791 A1* | 1/2019 | Waku | ...................... | F16H 61/02 |

* cited by examiner

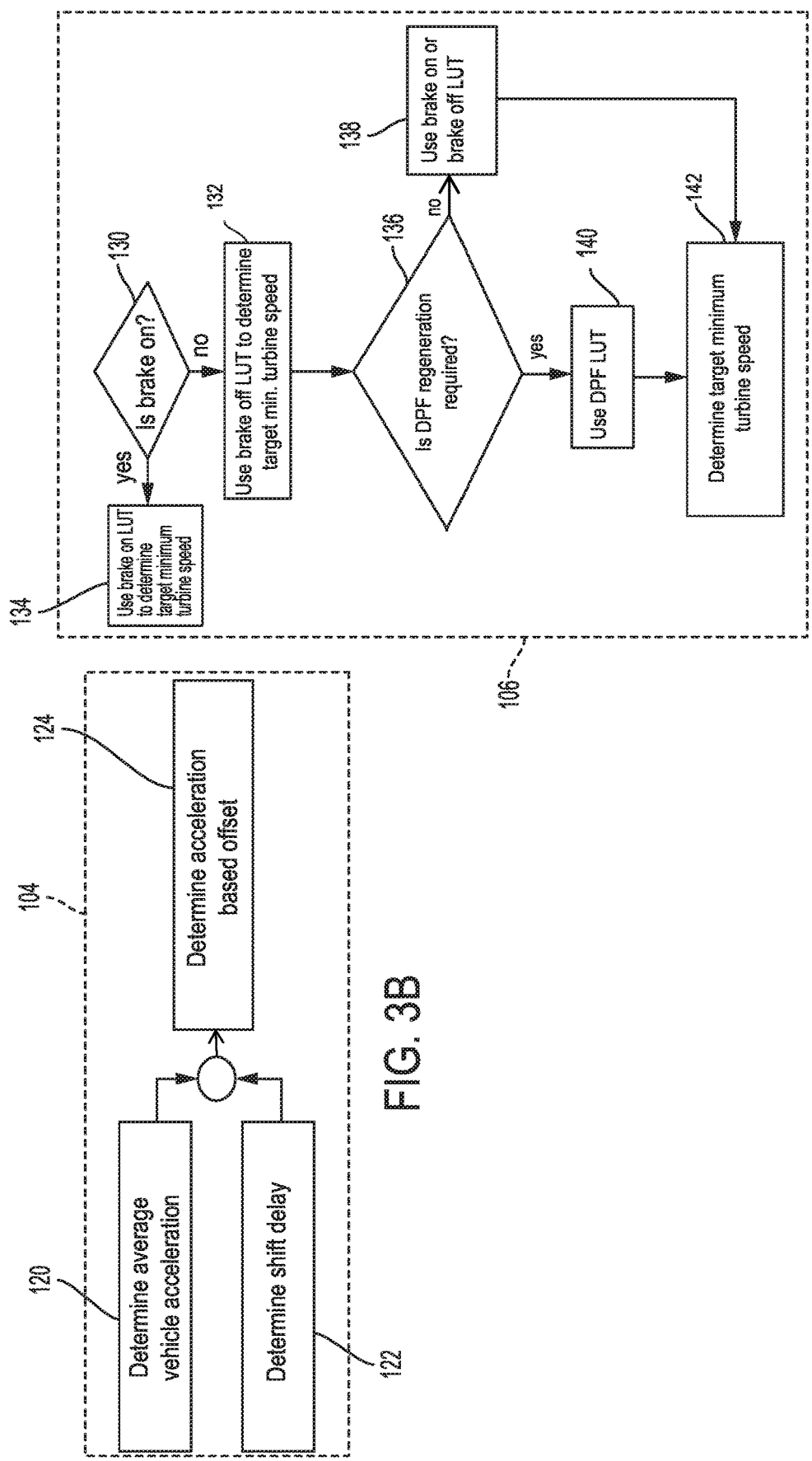

METHOD OF ADJUSTING DECELERATION DEPENDENT SHIFT POINTS

FIELD

The invention relates generally to automobile transmissions and more particularly to a method of adjusting deceleration dependent shift points to maintain a target minimum turbine speed.

BACKGROUND

The statements in this section merely provide background information related to the present disclosure and may or may not constitute prior art.

In order to realize more advantages from multi-speed transmissions such as better fuel economy, vehicle responsiveness, and shifting smoothness, a proper gear shift strategy being implemented in a transmission control module is of substantial importance.

The transmission mediates between the engine power and the power demand at the wheels by choosing a suitable gear ratio. Under dynamic driving conditions, the transmission is required to shift in order to match the power requirements commanded by the operator. A gear shift decision is also required to be consistent such that the vehicle can remain in the next gear for a period of time such that a minimum engine speed is maintained during deceleration. This minimum engine speed is based on drivability, NVH and engine stall protection requirements needed to compensate for various vehicle functions which affect engine idle speed.

As transmissions get more gear ratios, e.g., 8, 9, 10, or higher multi-speed transmissions, the task of choosing the most appropriate gear to maintain optimal vehicle responsiveness has become increasingly difficult. Thus, while current strategies for automatically controlling the shift sequencing of transmissions achieve their intended purpose, there is a desire to maintain a target minimum turbine speed during engine deceleration to improve vehicle responsiveness.

SUMMARY

One or more exemplary embodiments address the above issue by providing an automobile transmission system, and more particularly to a method of adjusting deceleration dependent shift points to maintain a target minimum turbine speed.

According to aspects of an exemplary embodiment, a method of adjusting deceleration dependent shift points to maintain a target minimum turbine speed includes adjusting a current turbine speed to a target minimum turbine speed in response to a deceleration condition. Another aspect includes calculating a vehicle speed offset based on vehicle acceleration rate a predicted downshift delay for the target minimum turbine speed. And another aspect of the exemplary embodiment includes converting the target minimum turbine speed to a target vehicle speed based on the deceleration condition. Still another aspect of the exemplary embodiment includes determining a target gear based on the vehicle speed offset and the target vehicle speed. And still another aspect of the exemplary embodiment includes downshifting to the target gear having vehicle speed less than or equal to a vehicle speed corresponding to the current turbine speed. And another aspect includes maintaining the target gear until a shift delay period is greater than a predetermined delay threshold.

Yet another aspect of the exemplary embodiment further includes downshifting to at least one other target gear when the shift delay period is greater than the predetermined delay threshold. And yet another aspect wherein a deceleration condition further includes brake status, deceleration rate, cold oil temperature or diesel particulate filter regeneration. And still another aspect includes wherein calculating further includes calculating a vehicle speed offset based on vehicle acceleration rate and a predicted downshift delay for each transmission gear. And another aspect includes wherein converting further includes using a turbine speed to vehicle speed conversion graph/look up table. A further aspect of the exemplary embodiment wherein converting further includes calculating the vehicle based on the target minimum turbine speed with a predetermined formula. Yet a further aspect of the exemplary embodiment wherein downshifting further includes converting the current turbine speed to vehicle speed. And still a further aspect of the exemplary embodiment further includes resetting all acceleration offsets if a gear upshift occurs. And another aspect includes determining if diesel particulate filter regeneration is required based on the deceleration condition. Still another aspect includes wherein adjusting further includes adjusting to a target minimum turbine speed that facilitates a diesel particulate filter regeneration condition if regeneration is required.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3B is an illustration of a first sub-algorithm process for adjusting deceleration dependent shift points to maintain a target minimum turbine speed in accordance with an aspects of the exemplary embodiment; and FIG. 3C is an illustration of a second sub-algorithm process for adjusting deceleration dependent shift points to maintain a target minimum turbine speed in accordance with an aspects of the exemplary embodiment.

DETAILED DESCRIPTION

The following description is merely exemplary in nature and is not intended to limit the present disclosure, application, or uses.

Figure 1:
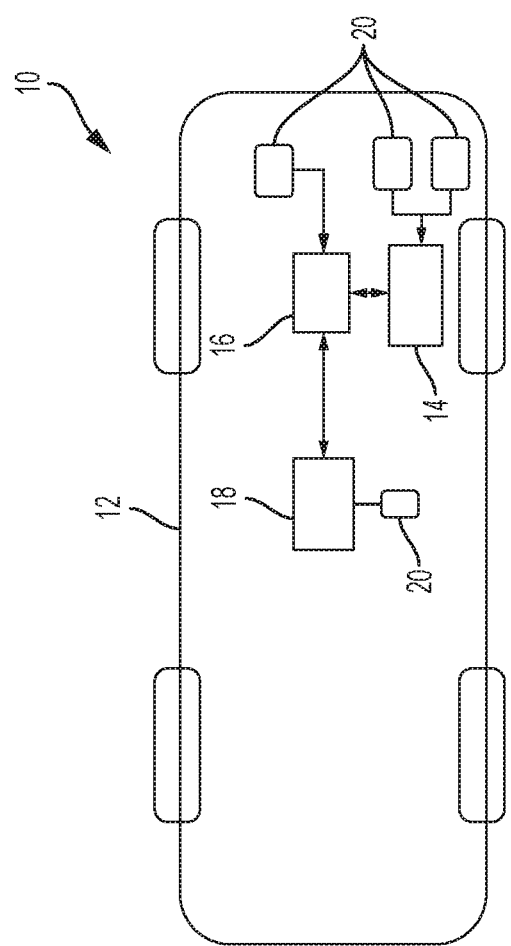
FIG. 1 is an illustration of a block diagram for a vehicle having control modules and sensors in accordance with an aspect of the exemplary embodiment.

With reference to FIG. 1, an exemplary block diagram 10 for a vehicle 12 having control modules (14, 16, 18) and sensors 20. The vehicle 12 includes a transmission control module (TCM) 14, an engine control module (ECM) 16, and a body control module (BCM). In accordance with the exemplary embodiment, sensors 20 are in communication with the TCM 14, ECM 16 and BCM 18 and can include, for example, an accelerator position sensor that senses the instantaneous position of an accelerator pedal, a brake pedal position sensor that senses the position of a brake pedal, a crank sensor for determining engine speed and vehicle speed, and a lateral G force sensor for determining side forces on a vehicle when cornering hard. The sensors 20 can then provide that information to the control modules (14, 16, and 18).

The ECM 16 operates as the "brain" of a vehicle and controls a plurality of actuators on an internal combustion engine to ensure optimal engine performance. The TCM 14 receives electrical signals from various sensors and data from the ECM 16 to regulate the gear shifting for optimal vehicle performance. The ECM 16 can compute the driver's commanded engine torque based on the vehicle speed and the position of accelerator pedal which sends a signal representative of the driver's torque request to the TCM 14. The ECM 16 can also use the instantaneous position of the accelerator pedal (interpreted from an accelerator pedal position sensor signal) to compute a rate of the accelerator pedal position (or accelerator pedal position rate), and use the engine speed (from a cam sensor) to compute an engine acceleration and/or vehicle speed.

The vehicle 12 includes internal combustion engine (not shown) that supplies a driving torque to the transmission (not shown). Traditionally, a transmission may be identified by the number of gear ratios it includes, for example, a 6, 8, 9, or 12 speed transmission. The transmission, capable of several forward gear ratios, in turn delivers torque to the driveshaft (not shown) and vehicle wheels.

A modern diesel vehicle will include a diesel particulate filter (DPF) (not shown) which is a device designed to remove diesel particulate matter or soot from the exhaust gas of the engine. The DPF needs to be cleaned regularly, through a process called regeneration, either active, passive or forced regeneration, the accumulated soot is burnt off at high temperature (around 600° c.) to leave only a residue of ash, effectively renewing or regenerating the filter, ready to take on more pollution from the exhaust gas. The regeneration process occurs at engine speeds higher than can generally be attained on city streets and thus a control module may be configured to periodically force an increase in engine speed to produce the heat necessary for the regeneration process.

Examples of look up tables (LUTs) used during vehicle decelerations event in accordance with the exemplary embodiment are presented. The examples include a Brake Off look up table (LUT) used during a vehicle deceleration event. The Brake Off LUT is used to determine at least one target minimum turbine speed (RPM) and a related vehicle acceleration rate (kmh/s) when the vehicle is in a deceleration condition without applying the brake, e.g., 0% pedal position. It is appreciated that during any deceleration condition/event that the vehicle will be in a (−) negative acceleration rate, e.g., slowing down, rather than increasing speed. As an example in using the Brake Off LUT, for a target minimum turbine speed of 1,300 RPM in $9^{th}$ gear, the related vehicle acceleration rate without the brake applied will be (−6) kmh/s. Thus, the vehicle speed will decrease by 6 kmh in 1 second for the time it begins to coast. The conversion between turbine (engine) speed (RPM) to vehicle speed (kmh) is made via the formula:

Turbine (engine) Speed=vehicle speed*1000*axle ratio*gear ratio/((120)PI( )*Tire radius)

As will be introduced below, the conversion from turbine speed to vehicle speed can also be readily determined from using FIG. 2 in accordance with the exemplary embodiment.

Another example of LUT is a Brake On LUT used during a vehicle deceleration event. The Brake On LUT is used to determine at least one target minimum turbine speed (RPM) and the related vehicle acceleration rate (kmh/s) when the vehicle is in a deceleration condition with the brake on, e.g., >5% pedal position. As an example, for a target minimum turbine speed of 2,200 RPM in $9^{th}$ gear, the related vehicle acceleration rate with the brake on will be (−6) kmh/s. Thus, the vehicle speed will decrease by 6 kmh one second (1 s) after the brake is applied. Notice that the target minimum turbine speed with the Brake On is greater than the Brake Off by 900 RPM while the vehicle acceleration rate remains constant at (−6) kmh/s. In this case, the target minimum turbine speed is set at a higher RPM such that if the vehicle operator were to suddenly cease braking and step back on the accelerator pedal then getting back to the correct turbine (engine) speed to meet the demand would not take as long to as opposed to having stepped back on the acceleration from a lower turbine speed.

Another example of a LUT is a shift delay/hold LUT used during a vehicle deceleration event in accordance with aspects of the exemplary embodiment. Whenever a downshift event occurs due to normal coast down or brake apply event, a shift delay/hold period must exceed a predetermined delay threshold before a subsequent downshift event can occur. However, the shift delay period may be interrupted by an upshift event such as the operator stepping into the accelerator pedal or DPF regeneration is required. Either of these conditions will cause all acceleration offsets to be reset to (0) zero until the next vehicle deceleration event condition. For a Power Off shift event from $9^{th}$ to $8^{th}$ gear, the shift delay/hold LUT indicates that the shift delay period to hold $8^{th}$ gear would be 4.8 seconds before the next deceleration shift event will occur. Notice that the accelerator pedal increased to change the status to Power on then the shift delay period to hold $8^{th}$ gear would be only 3.7 seconds because of the operator's desire to accelerate.

Figure 2:
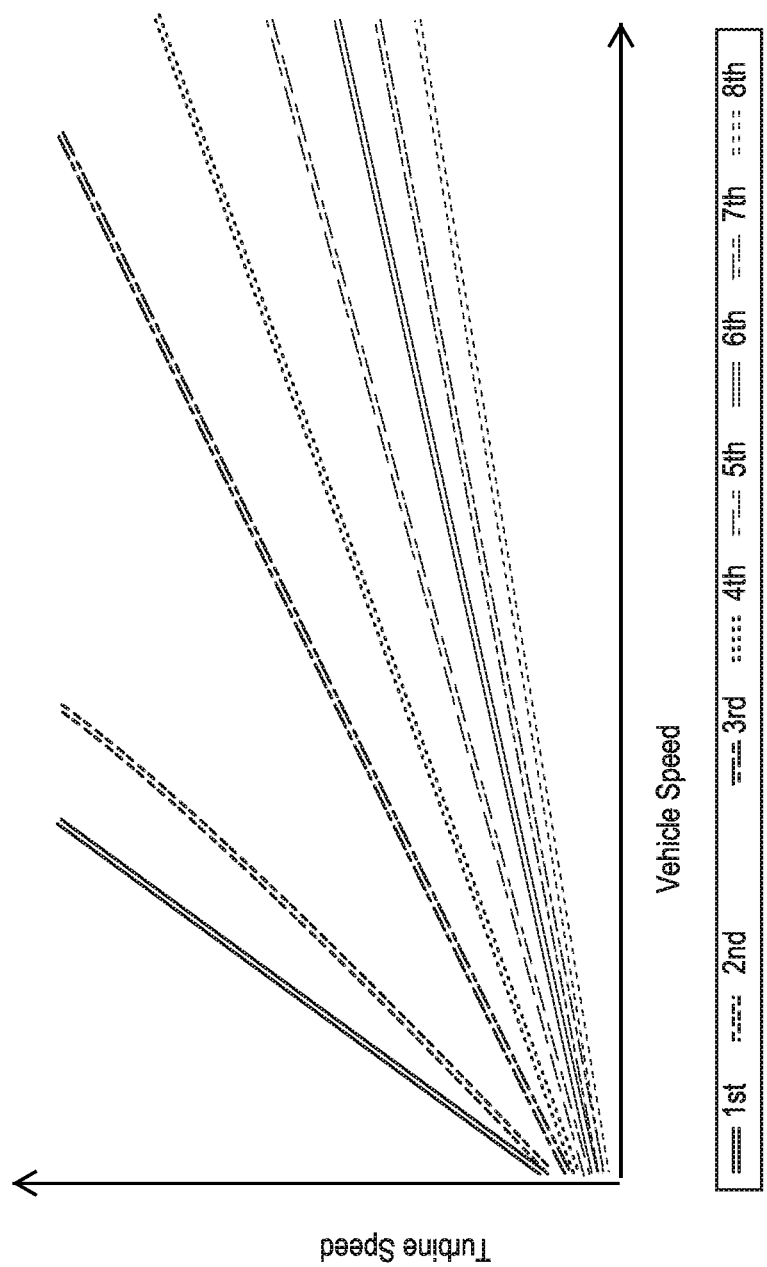
FIG. 2 is an illustration of graph of engine speed to vehicle speed relationship for various gears of a multi-speed transmission in accordance with an aspects of the exemplary embodiment.

Referring now to FIG. 2, a graph that converts a turbine (engine) speed to vehicle speed for various gears of a 9-speed transmission in accordance with an aspects of the exemplary embodiment is provided. For purposes of clarity, only 8 speeds are illustrated. For example, the relative engine speed when operating at a vehicle speed of 100 kmh in $4^{th}$ gear is approximately 3500 revolutions/minute (RPM). FIG. 2 is used with the Brake Off LUT and the Brake On LUT for readily converting turbine (engine) speed to vehicle speed for a 9-speed transmission instead of using the above described formula. Additionally, look up tables (not shown) which include overall target minimum turbine speeds as a function of various inputs may be used instead of the Brake Off LUT and the Brake On LUT as required to provide turbine speeds necessary under certain conditions, e.g., DPF regeneration LUT, Barometric Pressure Min LUT, Engine Coolant Min LUT. The highest values from these tables, the Brake Off LUT, or the Brake On LUT will be used for calculating the correct target minimum turbine speeds and shift points.

Figure 3A:
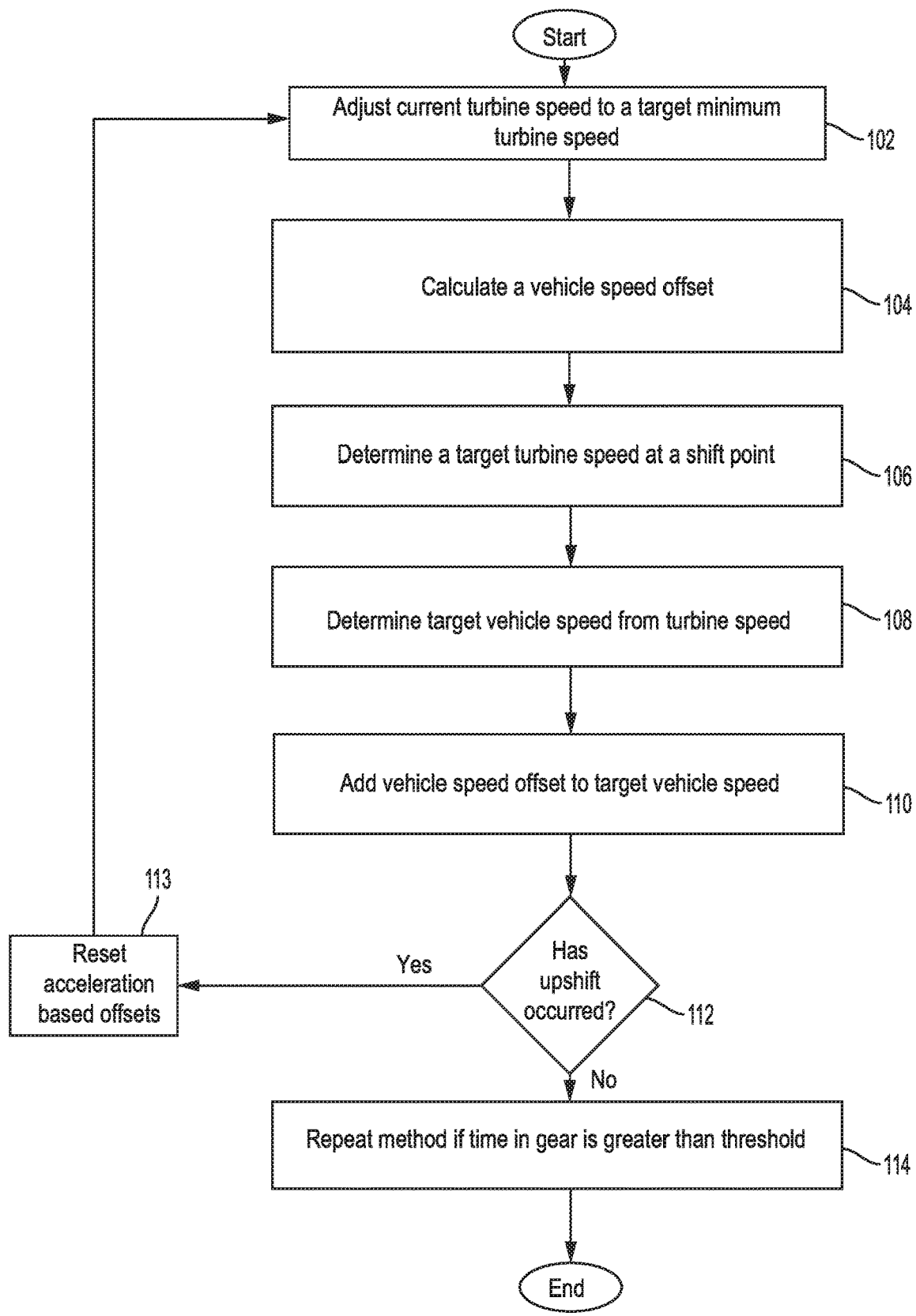
FIG. 3A is an illustration of an algorithm for adjusting deceleration dependent shift points to maintain a target minimum turbine speed in accordance with an aspects of the exemplary embodiment.

FIGS. 3A-3C are illustrations of algorithms for adjusting deceleration dependent shift points to maintain a target minimum turbine speed in accordance with an aspects of the exemplary embodiment. In FIG. 3A, at block 102, the method begins with adjusting the current turbine speed to a target minimum turbine speed in response to a deceleration condition, e.g., coasting down Brake Off, Brake On, DPF regeneration, etc. In accordance with the exemplary embodiment, the adjustment is automatically handled by the TCM 14 in response to the deceleration condition that occurs. Therefore, a vehicle traveling at a current turbine speed of 1100 RPM in $9^{th}$ gear may experience a coast down Brake Off condition and the TCM will automatically adjust to a target minimum turbine speed of 1300 RPM in $9^{th}$ in accordance with the exemplary embodiment.

Next, at block 104, the method continues with calculating a vehicle speed offset based on vehicle acceleration rate and a predicted downshift delay for the target minimum turbine speed (refer to FIG. 3B). Referring now to FIG. 3B, at block 120, the average vehicle acceleration (kmh/s) for the deceleration condition is determined by the TCM 14 and is multiplied by a predicted delay (sec/shift). For example, the average vehicle acceleration the Brake Off in $9^{th}$ gear at the target minimum turbine speed of 1300 RPM is (−6) kmh/s and the predicted delay/shift event (FIG. 3B, block 122) is approximately 1.5 seconds (the predicted time it will take from the time a downshift is commanded until it occurs). In this case, the acceleration based offset (at block 124) will be 9 kmh. The 9 kmh offset is added to the vehicle speed at 1300 RPM in $9^{th}$ gear, which from FIG. 2 is determined to be approximately 125 kmh, to obtain the vehicle speed for downshifting to $8^{th}$ gear. The result will be 134 kmh in $8^{th}$ gear. The (−6) kmh/s vehicle acceleration offset is stored in the TCM 14 for use in calculating the acceleration based offsets for the remaining gears.

Referring again to FIG. 3A, at block 106, the method continues with determining at least one target turbine speed shift point based on gear and brake status as described in FIG. 3C. At block 130, a determination is made as to whether the brake is Off or On whereby either the Brake Off LUT or the Brake On LUT is used, respectively. If the brake is On then, at block 134, the Brake On LUT, is used to determine the calibration values to use for determining the target minimum turbine speed(s) per gear. If the brake is Off then, at block 132, the Brake Off LUT is used to determine the calibration values to use for determining the target minimum turbine speed(s) per gear. For example, starting with a current turbine speed at 1100 RPM in $9^{th}$ gear (block 106, FIG. 3A), a conversion is made from 1100 RPM shift point to a vehicle speed using FIG. 2. At 1100 RPM in $9^{th}$ gear, the vehicle speed is determined to be approximately 105 kmh. The vehicle acceleration rate is (−4) kmh/s. The vehicle speeds for the remaining gears are determined using the Brake On LUT and the Brake Off LUT.

Next, in accordance with the exemplary embodiment, an adjustment to a desired target minimum turbine speed at a 1300 RPM shift point in $9^{th}$ gear is made by the TCM using the Brake Off LUT. Then, returning to FIG. 3A at block 108, the conversion from 1300 RPM shift point to a target vehicle speed is determined to be approximately 125 kmh using the FIG. 2 graph. The vehicle acceleration rate is (−6) kmh/s and, accordingly at block 108, the corresponding acceleration offset value of 9 kmh is added to the vehicle speed of 125 kmh conversion from the target minimum turbine speed of 1300 RPM. As such, (at block 110, FIG. 3A) the resulting target vehicle speed to adjust/shift to is 134 kmh for a $9^{th}$ gear to $8^{th}$ gear shift. The target minimum turbine speed for $8^{th}$ gear at 134 kmh remains at 1300 RPM. The adjusted shift points for downshifting to the subsequent gears are also determined and stored in an array within the TCM. Thus, to maintain a target minimum turbine speed of 1300 RPM with the acceleration offset of 9 kmh, the first downshift will be from $9^{th}$ to $8^{th}$ gear at a vehicle speed of 134 kmh with the same target minimum turbine speed at 1300 RPM. At block 134, similar calculations would be made by the TCM to determine the target minimum turbine speeds with Brake On deceleration condition.

The downshifting from $9^{th}$ gear to $8^{th}$ gear starts a shift delay/hold period during which the downshift to $8^{th}$ gear will be frozen for 4.8 seconds before a subsequent downshift can occur. Alternatively, the shift delay period can be interrupted by an upshift, e.g., stepping into the accelerator or DPF regeneration by accelerating in gear to the next upshift point, in which case the delay timer will be reset and all offsets will be set to 0 km/h.

At block 136, the method continues with determining if diesel particulate filter (DPF) regeneration is required. If DPF regeneration is required and a DPF look up table has target minimum turbine values greater than the Brake Off LUT or the Brake On LUT then, at block 140, a DPF look up table will be used to determine the target minimum turbine speed(s) in accordance with the exemplary embodiment. If a DPF regeneration is not required then, at block 138, the method will use the Brake Off LUT or the Brake On LUT dependent on brake status to determine the target minimum turbine speed(s). At block 142, all target minimum turbine speeds and vehicle speeds are determined by the TCM in accordance with the exemplary embodiment.

Returning again to FIG. 3A, at block 112, the method continues with determining if an upshift event has occurred. If so, at block 113, the method continues with resetting all accelerated based offsets to 0 km/h. If an upshift event has not occurred then, at block 114, the method continues with determining if a time in gear is greater than a predetermined delay threshold based on brake status (On/Off). If a time in gear is greater than a predetermined delay threshold then the method returns to block 102 to continue the process until the vehicle ignition is switched off.

The description of the method is merely exemplary in nature and variation that do not depart from the gist of the embodiment are intended to be within the scope of the embodiment. Such variations are not to be regarded as a departure from the spirit and scope of the exemplary embodiment.

What is claimed is:

1. A method of adjusting deceleration dependent shift points to maintain a target minimum turbine speed comprising:
   adjusting a current turbine speed to the target minimum turbine speed in response to a deceleration condition;
   calculating a vehicle speed offset based on vehicle acceleration rate and a predicted downshift delay for the target minimum turbine speed;
   converting the target minimum turbine speed to a target vehicle speed based on the deceleration condition;
   determining a target gear based on the vehicle speed offset and the target vehicle speed;
   downshifting to the target gear having vehicle speed less than or equal to a vehicle speed corresponding to the current turbine speed;
   maintaining the target gear until a shift delay period is greater than a predetermined delay threshold; and
   downshifting to at least one other target gear when the shift delay period is greater than the predetermined delay threshold.

2. The method of claim 1 wherein a deceleration condition further comprises brake status, deceleration rate, cold oil temperature or diesel particulate filter regeneration.

3. The method of claim 1 wherein calculating further comprises calculating a different vehicle speed offset based on a different vehicle acceleration rate and a different predicted downshift delay for each transmission gear.

4. The method of claim 1 wherein converting further comprises using a turbine speed to vehicle speed conversion graph/look up table.

5. The method of claim 1 wherein converting further comprises calculating the target vehicle speed based on the target minimum turbine speed with a predetermined formula.

6. The method of claim 1 further comprising resetting all acceleration offsets if a gear upshift occurs.

7. The method of claim 1 further comprising determining if diesel particulate filter regeneration is required based on the deceleration condition.

8. The method of claim 7 wherein adjusting further comprises adjusting to a target minimum turbine speed that facilitates a diesel particulate filter regeneration condition if the regeneration is required.

9. A method of adjusting deceleration dependent shift points to maintain a target minimum turbine speed comprising:
    adjusting a current turbine speed to the target minimum turbine speed in response to a deceleration condition;
    calculating a vehicle speed offset based on vehicle acceleration rate and a predicted downshift delay for the target minimum turbine speed;
    converting the target minimum turbine speed to a target vehicle speed based on the deceleration condition;
    determining a target gear based on the vehicle speed offset and the target vehicle speed;
    downshifting to the target gear having vehicle speed less than or equal to a vehicle speed corresponding to the current turbine speed;
    maintaining the target gear until a shift delay period is greater than a predetermined delay threshold; and
    resetting all acceleration offsets if a gear upshift occurs.

10. The method of claim 9 further comprising downshifting to at least one other target gear when the shift delay period is greater than the predetermined delay threshold.

11. The method of claim 9 wherein a deceleration condition further comprises brake status, deceleration rate, cold oil temperature or diesel particulate filter regeneration.

12. The method of claim 9 wherein calculating further comprises calculating a different vehicle speed offset based on a different vehicle acceleration rate and a different predicted downshift delay for each transmission gear.

13. The method of claim 9 wherein converting further comprises using a turbine speed to vehicle speed conversion graph/look up table.

14. The method of claim 9 wherein converting further comprises calculating the target vehicle speed based on the target minimum turbine speed with a predetermined formula.

15. The method of claim 9 further comprising determining if diesel particulate filter regeneration is required based on the deceleration condition.

16. The method of claim 15 wherein adjusting further comprises adjusting to a target minimum turbine speed that facilitates a diesel particulate filter regeneration condition if the regeneration is required.

* * * * *